United States Patent
Lynar et al.

(10) Patent No.: US 9,442,885 B2
(45) Date of Patent: *Sep. 13, 2016

(54) ESTIMATING THE TIME UNTIL A REPLY EMAIL WILL BE RECEIVED USING A RECIPIENT BEHAVIOR MODEL

(71) Applicant: INTERNATIONAL BUSINESS MACHINES CORPORATION, Armonk, NY (US)

(72) Inventors: Timothy M. Lynar, Carlton Vic (AU); Kent C. Steer, Carlton Vic (AU)

(73) Assignee: International Business Machines Corporation, Armonk, NY (US)

( * ) Notice: Subject to any disclaimer, the term of this patent is extended or adjusted under 35 U.S.C. 154(b) by 827 days.

This patent is subject to a terminal disclaimer.

(21) Appl. No.: 13/722,003

(22) Filed: Dec. 20, 2012

(65) Prior Publication Data

US 2014/0089235 A1    Mar. 27, 2014

Related U.S. Application Data

(63) Continuation of application No. 13/627,075, filed on Sep. 26, 2012, now Pat. No. 9,146,895.

(51) Int. Cl.
*G06F 15/18* (2006.01)
*H04L 12/58* (2006.01)
*G06N 99/00* (2010.01)
*G06N 5/04* (2006.01)

(52) U.S. Cl.
CPC ............... *G06F 15/18* (2013.01); *H04L 51/02* (2013.01); *H04L 51/22* (2013.01); *G06N 5/04* (2013.01); *G06N 99/005* (2013.01)

(58) Field of Classification Search
None
See application file for complete search history.

(56) References Cited

U.S. PATENT DOCUMENTS

| | | | |
|---|---|---|---|
| 7,089,241 B1 * | 8/2006 | Alspector | G06Q 10/107 |
| 7,389,277 B2 * | 6/2008 | Chen | G06N 99/005 706/21 |
| 8,046,418 B1 | 10/2011 | Denise | |
| 8,744,979 B2 * | 6/2014 | Sundelin | G06Q 10/107 706/12 |
| 2010/0017484 A1 | 1/2010 | Accapadi et al. | |
| 2010/0169264 A1 | 7/2010 | O'Sullivan et al. | |
| 2011/0087744 A1 * | 4/2011 | Deluca | G06Q 10/107 709/206 |

FOREIGN PATENT DOCUMENTS

JP    2011129037 A    6/2011

* cited by examiner

*Primary Examiner* — Kakali Chaki
*Assistant Examiner* — Ababacar Seck
(74) *Attorney, Agent, or Firm* — Tutunjian & Bitetto, P.C.; Louis J. Percello

(57) ABSTRACT

A system is provided. The system includes a recipient behavior model for generating an estimate of a receipt time of a reply email from a recipient of an initial email by applying machine learning to the initial email and to training data from other emails. The system further includes an indicator device for indicating the estimate to a user.

18 Claims, 5 Drawing Sheets

ESTIMATING THE TIME UNTIL A REPLY EMAIL WILL BE RECEIVED USING A RECIPIENT BEHAVIOR MODEL

CROSS-REFERENCE TO RELATED APPLICATIONS

This application is a Continuation application of co-pending U.S. patent application Ser. No. 13/627,075 filed on Sep. 26, 2012, incorporated herein by reference in its entirety.

BACKGROUND

1. Technical Field

The present principles relate generally to electronic mail and, in particular, to estimating the time until a reply email will be received using a recipient behavior model.

2. Description of the Related Art

For a variety of reasons, email remains extremely popular for both business and personal communication. However, presently, when a user sends an email, he or she has little or no information on the time until a reply will be received.

SUMMARY

According to an aspect of the present principles, there is provided a method in an email communication system having at least a processor. The method includes generating an estimate of a receipt time of a reply email from a recipient of an initial email using a recipient behavior model that applies machine learning to the initial email and to training data from other emails. The method further includes indicating the estimate to a user using an indication device.

According to another aspect of the present principles, there is provided a computer program product for providing an estimate of a receipt time of a reply email from a recipient of an initial email. The computer program product includes a computer readable storage medium having program code embodied therewith. The program code is executable by a computer to perform a method. The method includes generating the estimate of the receipt time of the reply email from the recipient of the initial email using a recipient behavior model that applies machine learning to the initial email and to training data from other emails. The method further includes indicating the estimate to a user using an indication device.

According to yet another aspect of the present principles, there is provided a system. The system includes a recipient behavior model for generating an estimate of a receipt time of a reply email from a recipient of an initial email by applying machine learning to the initial email and to training data from other emails. The system further includes an indicator device for indicating the estimate to a user.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to estimating the time until a reply email will be received using a recipient behavior model.

The present principles provide the sender of an email with an estimate of the time until a reply email will be received (if applicable). For each recipient of a new email, the present principles use the body of the current email and a model of recipient behavior to estimate the time at which a reply email will be received. The provision of such information is a form of expectation management; if the sender knows how long he or she must wait, they will be less frustrated. This information also allows the sender to better plan their activities and, if necessary, take additional action if the expected response time is unacceptable.

Figure 1:
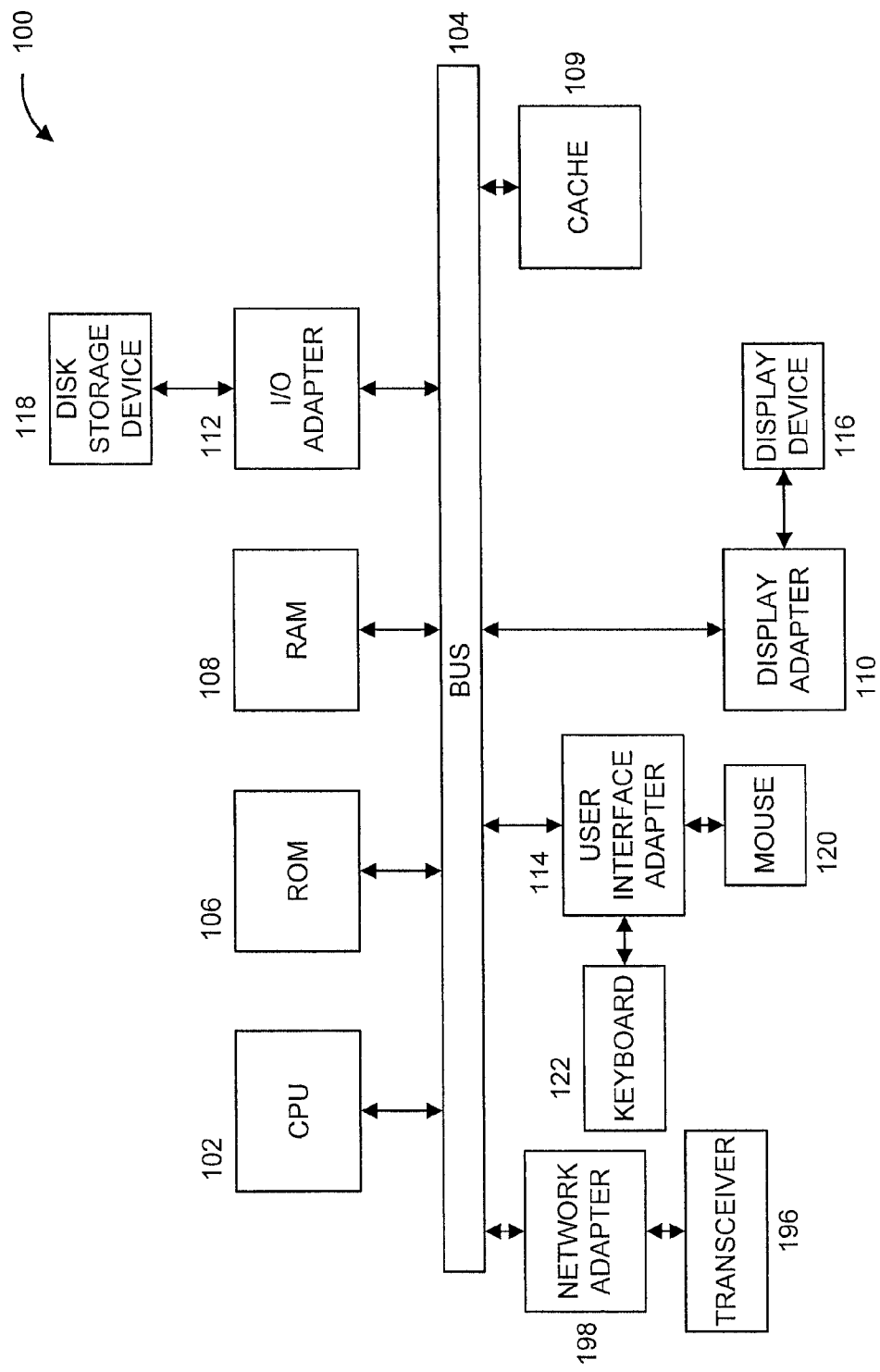
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 102 operatively coupled to other components via a system bus 104. A read only memory (ROM) 106, a random access memory (RAM) 108, a display adapter 110, an I/O adapter 112, a user interface adapter 114, and a network adapter 198, are operatively coupled to the system bus 104.

A display device 116 is operatively coupled to system bus 104 by display adapter 110. A disk storage device (e.g., a magnetic or optical disk storage device) 118 is operatively coupled to system bus 104 by I/O adapter 112.

A mouse 120 and keyboard 122 are operatively coupled to system bus 104 by user interface adapter 214. The mouse 120 and keyboard 122 are used to input and output information to and from system 100.

A transceiver 196 is operatively coupled to system bus 104 by network adapter 198.

Of course, the processing system 100 may also include other elements (not shown), as readily contemplated by one of skill in the art, as well as omit certain elements. For example, system 200 described below with respect to FIG. 2 and system 300 described below with respect to FIG. 3 are respective systems for implementing respective embodiments of the present principles. Part or all of processing system 100 may be implemented in one or more of the elements of system 200. Also, part or all of processing system 100 may be implemented in one or more of the elements of system 300.

Figure 4:
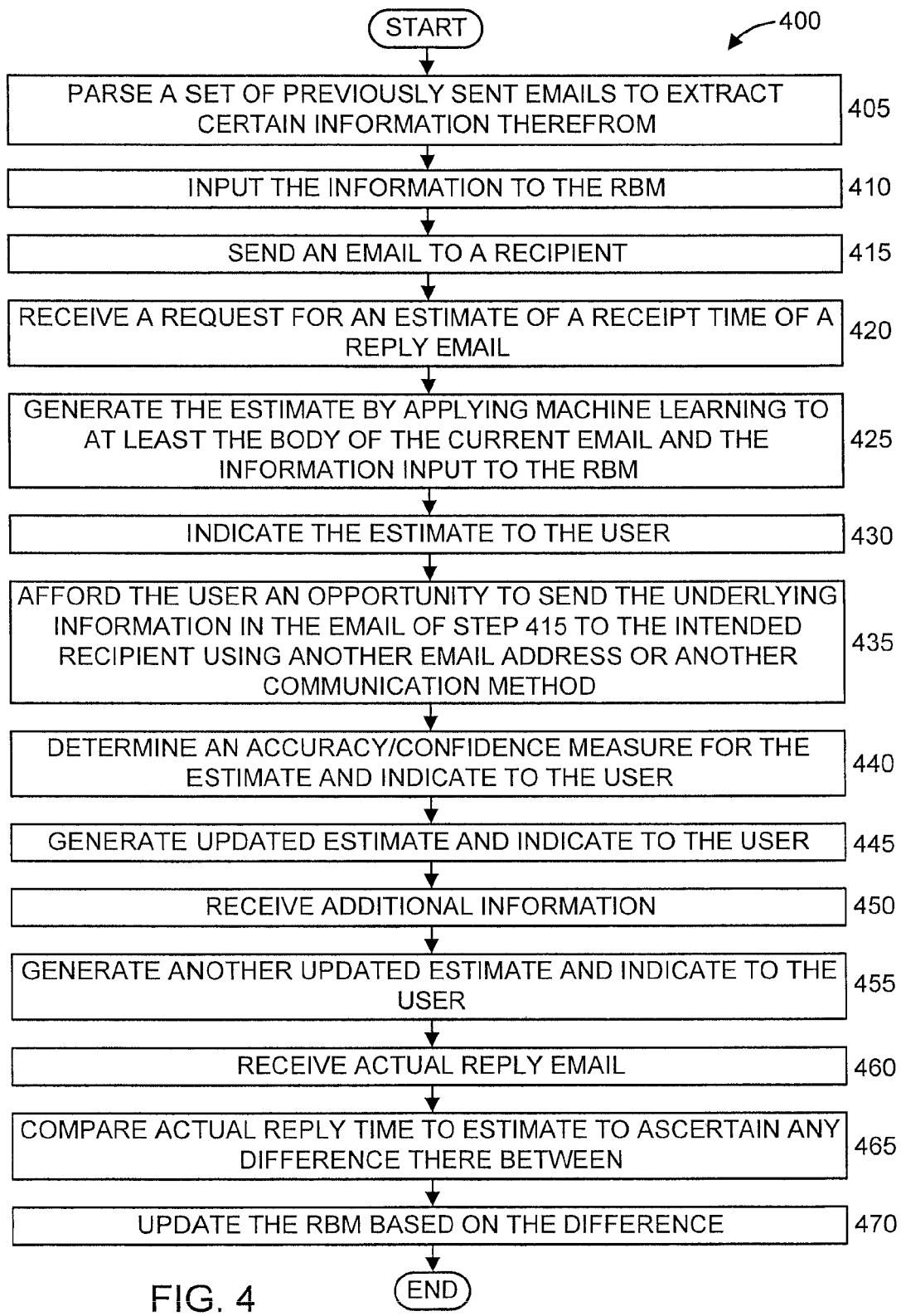
FIG. 4 shows an exemplary method 400 for estimating a receipt time of a reply email using a recipient behavior model, in accordance with an embodiment of the present principles.
Figure 5:
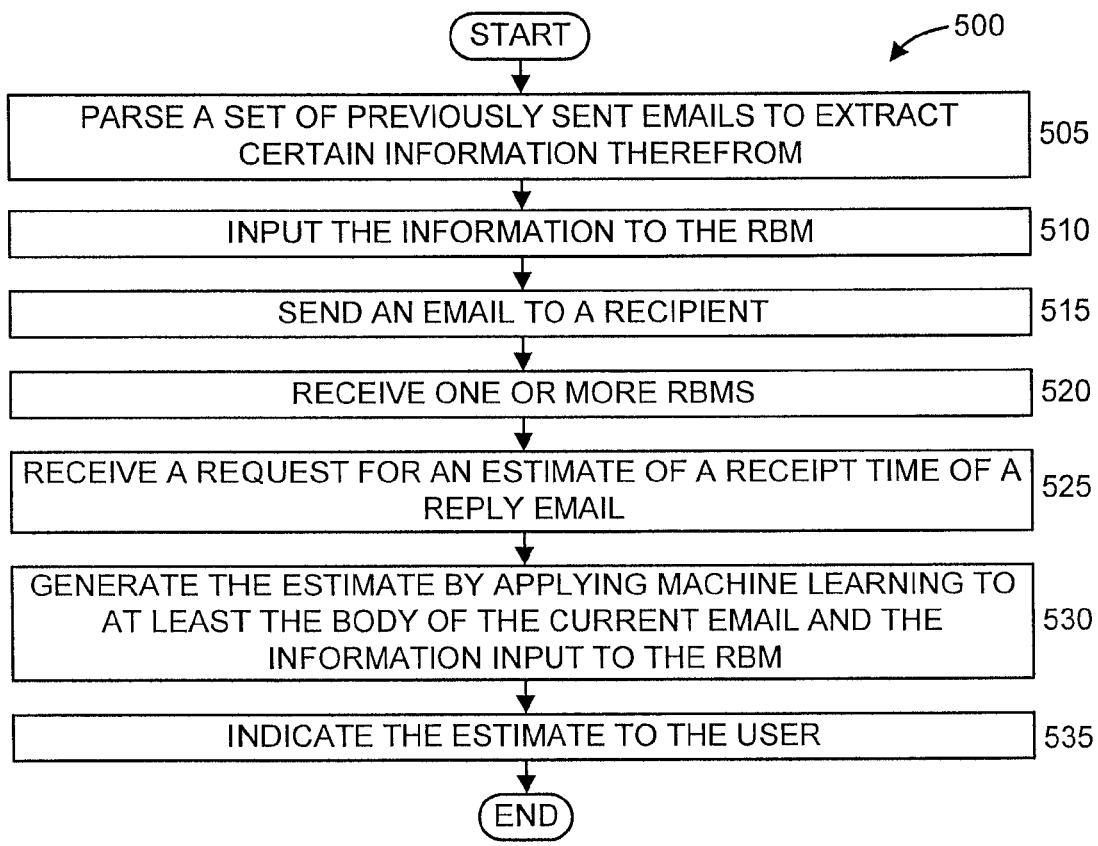
FIG. 5 shows another exemplary method 500 for estimating a receipt time of a reply email using a recipient behavior model, in accordance with an embodiment of the present principles.

Moreover, it is to be appreciated that processing system 100 may perform at least part of the methods described herein including, for example, parts of method 400 of FIG. 4 and/or parts of method 500 of FIG. 5.

Figure 2:
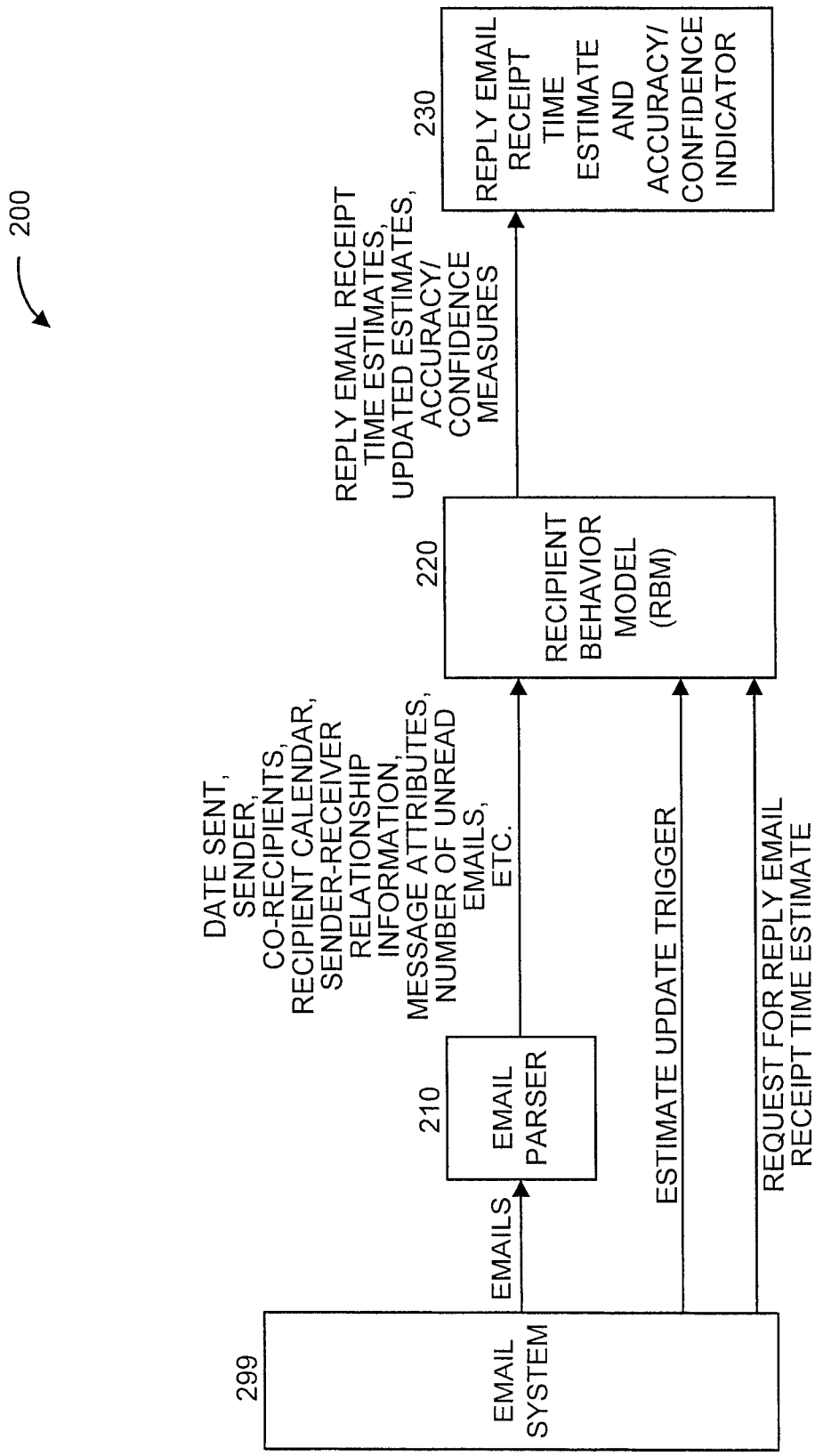
FIG. 2 shows an exemplary system 200 for estimating a receipt time of a reply email using a recipient behavior model, in accordance with an embodiment of the present principles.
Figure 3:
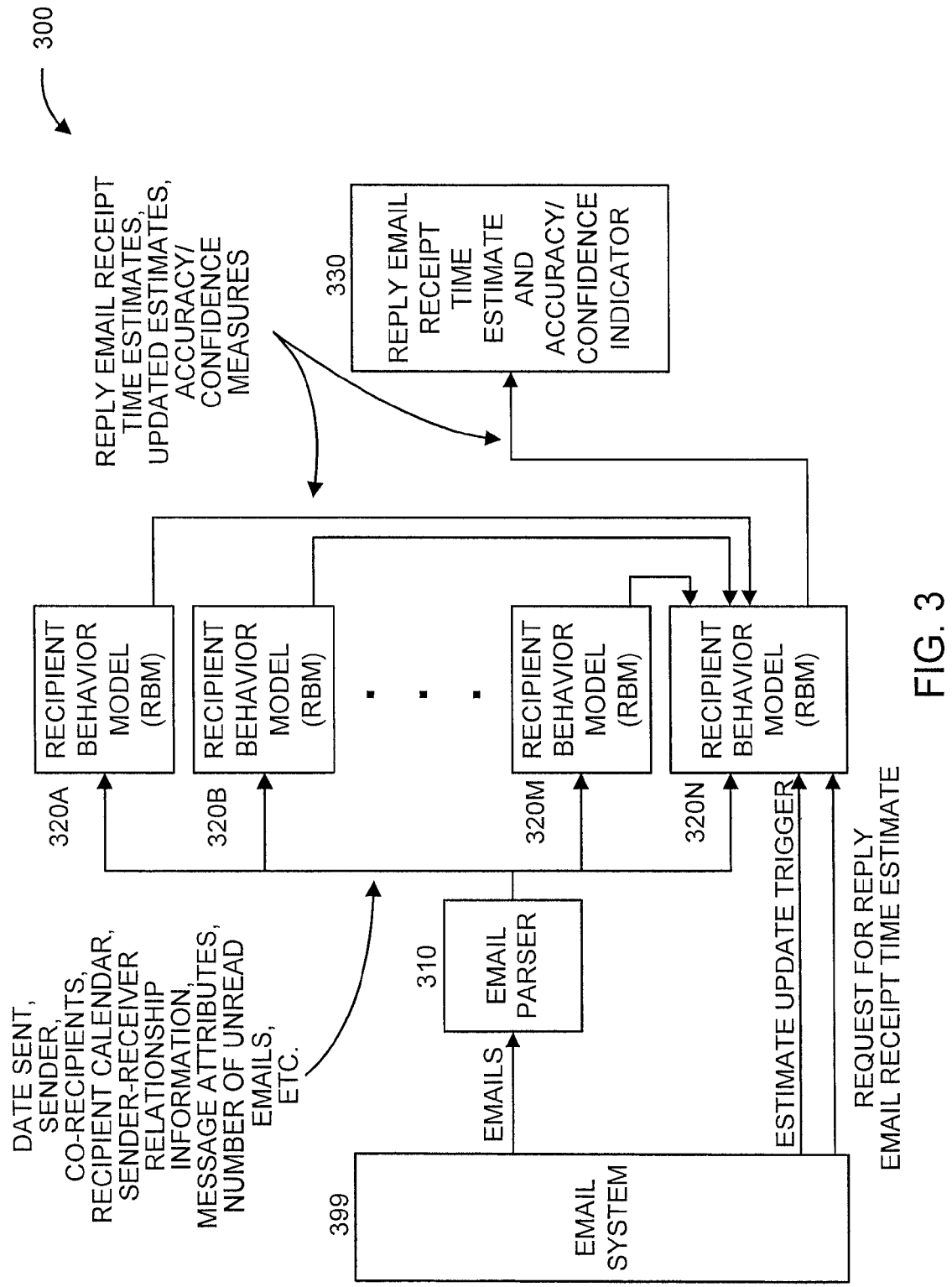
FIG. 3 shows another exemplary system 300 for estimating a receipt time of a reply email using a recipient behavior model, in accordance with an embodiment of the present principles.

FIG. 2 shows an exemplary system 200 for estimating a receipt time of a reply email using a recipient behavior model, in accordance with an embodiment of the present principles. The system 200 includes an email parser 210, a recipient behavior model (RBM) 220, and a reply email receipt time estimate and accuracy/confidence measure indicator (hereinafter "reply email receipt time estimate indicator" in short) 230.

The email parser 210 parses emails to determine certain information therefrom. Examples of such information include, but are not limited to, date sent, sender, co-recipients, recipient calendar, sender-receiver relationship information, message attributes, number of unread emails in the recipient's email inbox, and so forth. One or more of the preceding can be input to the RBM 220 as described in further detail herein below.

In the embodiment of FIG. 2, the email parser 210 is connected to an email system 299. Accordingly, the emails from (e.g., the inbox of) the email system 299 are parsed by the email parser 210.

In an embodiment, emails can simply be provided directly to the email parser, for example, in a personal storage table (PST) file or similar file, without the need for the email parser 210 to be connected to email system 299. For example, the same may be provided using a universal serial bus (USB) key or some other connectable memory medium or may be transmitted to the email parser using wired and/or wireless communication technologies, thus obviating the need for a direct connection between the email parser 210 and the email system 299.

The RBM 220 receives, from the email parser 210, one or more of the above-identified types of information as an input thereto. The RBM 220 processes the received input(s) to generate an estimate therefrom of a time of receipt of a reply email. The estimate is output from the RBM 220. In an embodiment, the RBM 220 can also output an indication of the accuracy/confidence of the estimate.

In an embodiment, the estimate and the accuracy/confidence level are determined by the RBM 220 either statistically and/or analytically. In an embodiment, the RBM is generated by a machine learning device 221. In an embodiment, the machine learning device 221 includes a neural network system 222 and a decision tree induction system 223. Of course, other embodiments can include one of the neural network system 222 and the decision tree system 223.

Moreover, in an embodiment, the RBM 220 can update an estimate previously output therefrom in order to provide an updated estimate. The updated estimate is presumably more accurate than the previous estimate it replaces. The updated estimate can be based on, for example, additional information that is acquired and evaluated or can simply be based on the same information being further evaluated over time.

The RBM generates the estimate responsive to a request for the same. In the embodiment of FIG. 2, that request is provided through the email system 299. In other embodiments, the request may be provided directly to the RBM 220 or through another entity (other than email system 299) to the RBM 220. Moreover, the request can be automatically generated.

An updated estimate can be generated responsive to an update trigger. In the embodiment of FIG. 2, that trigger is provided through the email system 299. In other embodiments, the trigger may be provided directly to the RBM 220 or through another entity (other than email system 299) to the RBM 220. The trigger may include various types of information, as described in further detail herein, or an explicit request by the user for an updated estimate.

The reply email receipt time estimate indicator 230 indicates to the user the receipt time estimate for a reply email. The reply email receipt time estimate indicator 230 can be, and/or otherwise include, a display device, a speaker, a widget, and so forth.

While shown as being separate from the email system 299, it is to be appreciated that one or more of the elements of system 200 can be implemented in email system 299. For example, the reply email receipt time estimate indicator 230 can be part of the email system 299 and thus provide an indication of the estimate to the user using the same user interface that the user uses for emailing. To elaborate further, such indication may be provided within a window or field of an existing user interface 291 in email system 299. Given the teachings of the present principles provided herein, these and other variations are readily contemplated by one of ordinary skill in the art, while maintaining the spirit of the present principles. In other embodiments, a desktop widget may be used to indicate the estimate to the user. The preceding implementations of the indicator 230 are merely illustrative and, thus, other types of indicators can also be used in accordance with the teachings of the present principles, while maintaining the spirit of the present principles.

It is to be appreciated that system 200 may perform at least part of the methods described herein including, for example, parts of method 400 of FIG. 4.

FIG. 3 shows another exemplary system 300 for estimating a receipt time of a reply email using a recipient behavior model, in accordance with an embodiment of the present principles. The system 300 includes an email parser 310, a set of recipient behavior models (RBMs) 320A-N, and a reply email receipt time estimate and accuracy/confidence measure indicator (hereinafter "receipt time estimate indicator" in short) 330.

In the embodiment of FIG. 3, the set of RBMs 320A-N are collectively used to generate an estimate of the time of receipt of a reply email, an updated estimate, and accuracy/confidence measures for the estimates. In the embodiment of FIG. 3, the inputs to each RBM can also include a previous estimate. In the embodiment of FIG. 3, the set of recipient behavior models are configured in a master-slave configuration, and a master recipient behavior model from among the recipient behavior models in the set is used to output the estimate that is indicated to the user.

In the embodiment of FIG. 3, a master RBM 320A from the set of RBMs 320A-N is used to finally generate/refine an estimate. In an embodiment, the master RBM 320A is the RBM that is local to the individual requesting the estimate. Of course, other ones of the RBMs can also be used as the master RBM. For example, in other embodiments, the master RBM is whichever one has information about the recipient, or the most information, or the highest accuracy/confidence value for this or a previous estimate for the same recipient. The master RBM 320A uses one or more estimates and/or other information output from one or more of RBM 320B through RBM 320N to generate the estimate that is then indicated to the user via the reply email receipt time estimate indicator 330.

In an embodiment, the RMBs 320A-N can be configured in a parallel configuration. In such a case, more than one of the RBMs can generate an estimate. A tie breaker or other selection device (not shown) can be used to determine which estimate is to be used. The tie breaker or other selection device can choose a particular estimate or average more than one estimate, and so forth.

The RBMs in the set can all be local with respect to a single email sender. Alternatively, the RBMs can include one or more RBMs that have been received from other email senders and/or recipients such that any data generated by the others can be used to aid in the generation of the current estimate for the current sender.

While a single email parser 310 is shown in FIG. 3 supplying each of the RBM 320A through RBM 320N with certain information, in other embodiments, more than one email parser may used. For example, each RBM or subset of RBMs may have its own email parser. Such email parsers may reside at the location of each group member, where the models can be transmitted to (shared with) other group members.

It is to be appreciated that system 300 may perform at least part of the methods described herein including, for example, parts of method 400 of FIG. 4.

FIG. 4 shows an exemplary method 400 for estimating a receipt time of a reply email using a recipient behavior model, in accordance with an embodiment of the present principles.

At step 405, a set of previously sent emails is parsed (e.g., by the parser 210) to extract certain information therefrom. The certain information can include, but is not limited to, date sent, sender, co-recipients, recipient calendar, sender-receiver relationship information, message attributes, number of unread emails in the recipient's email inbox, and so forth. In an embodiment, this information is considered training data.

At step 410, the extracted information is input to the recipient behavior model (RBM).

At step 415, an email is sent to a recipient.

At step 420, a request is received for an estimate of a receipt time of a reply email to be sent in response to the email of step 415.

At step 425, the RBM generates the estimate of the receipt time of the reply email by applying machine learning (e.g., using machine learning device 221) to at least the body of the current email (sent at step 415) and the information input to the RBM at step 410. The machine learning can include and/or otherwise involve neural networks (e.g., using neural network system 222) and/or decision tree induction (e.g., using decision tree induction system 223).

At step 430, the estimate is indicated to a user.

At step 435, the user is afforded an opportunity to send the underlying information in the email of step 415 to the intended recipient using another email address or another communication method altogether. This opportunity allows the user to try to communicate with the recipient in a different manner, if the estimated time of reply is too great and/or otherwise unacceptable to the original email sender. While only shown in method 400 with respect to step 435, it is to be appreciated that such opportunity can be afforded the original email sender each time he or she receives an estimate, an updated estimate, or an accuracy/confidence measure.

At step 435, an accuracy/confidence measure for the estimate is determined and indicated to the user.

At step 440, given the further processing over time of the information received by the RBM 220, an updated estimate is generated and indicated to the user.

At step 445, additional information is received by the RBM 220.

At step 450, given the additional information received and processed by the RBM 220, another updated estimate is generated and indicated to the user.

At step 455, the actual reply email is received (in response to the email of step 415).

At step 460, the actual reply time of the reply email is compared to the estimate to ascertain any difference there between.

At step 465, the difference, if any, is provided as another input to the model.

At step 470, the model is updated based on the difference.

FIG. 5 shows another exemplary method 500 for estimating a receipt time of a reply email using a recipient behavior model, in accordance with an embodiment of the present principles. In an embodiment, the method 500 is performed with respect to a predefined group of individuals who share emails.

At step 505, a set of previously sent emails is parsed (e.g., by the parser 210) to extract certain information therefrom. The certain information can include, but is not limited to, date sent, sender, co-recipients, recipient calendar, sender-receiver relationship information, message attributes, number of unread emails in the recipient's email inbox, and so forth. In an embodiment, this information is considered training data.

At step 510, the extracted information is input to the recipient behavior model (RBM).

At step 515, an email is sent to a recipient.

At step 520, one or more RBMs are received from members of the group. The RBMs from the same group member correspond to different recipients. However, if more than one group member sends an RBM, there is a chance that two RBMs are sent that correspond to a same recipient.

At step 525, a request is received for an estimate of a receipt time of a reply email to be sent in response to the email of step 515.

At step 530, one or more of the RBMs, working together if more than one, generate the estimate of the receipt time of the reply email by applying machine learning (e.g., using machine learning device 221) to at least the body of the current email (sent at step 515) and the information input to the RBM at step 510. The machine learning can include and/or otherwise involve neural networks (e.g., using neural network system 222) and/or decision tree induction (e.g., using decision tree induction system 223).

At step 535, the estimate is indicated to a user.

While not shown for the sake of brevity, method 500 may include steps similar to steps 435-470 from method 400 of FIG. 4, to afford to a user an opportunity to send the underlying information in the email of step 515 to the intended recipient using another email address or another communication method altogether, to generate updated estimates, to generate accuracy/confidence measures for the estimates, and to update the RMB(s).

The present principles include a recipient behavior model (RBM). Inputs to the RBM can include, but are not limited to, one or more of the following: date sent (i.e., time of day, day of week, time zone, etc.); estimated date of receipt (should be the same as above, but could be delayed by transmission); sender; co-recipients (i.e., others CC'd); recipient calendar; sender-receiver relationship information (e.g., friend, manager, client); message attributes; length; number of questions; importance/urgency; topic; subject; keywords; tone; signature; presence of attachments; and number of unread emails in recipient's email in-box.

The output of the model is the aforementioned time until a reply email is received by the original sender. In an embodiment, the model can also output an indication of the accuracy/confidence of the estimate.

There are many ways to construct the RBM, for example, statistically and/or analytically. Our preferred embodiment employs machine learning to acquire an understanding of the relationship between the input attributes and the output value(s). However, it is to be appreciated that the present principles are not limited to machine learning and, thus, other mechanisms and so forth may be used to construct the RBM while maintaining the spirit of the present principles.

Two popular and exemplary machine learning techniques to which the present principles can be applied are neural networks and decision tree induction. Both of the preceding machine learning techniques could easily be applied here by one skilled in the art. To use the machine learning approach, access to a set of training examples is desired. These examples are easily obtained from previous email correspondences. A new example could be derived for each email. Even those which were not sent as a reply to a previous email are useful as they provide information about the times when that person is likely to send. Most of the above inputs are easily extracted from individual messages. The more complex message attributes, such as topic and number of questions, are computed after analyzing the text.

The recipient model can be built offline (i.e., the learning process need not be re-run for every new email). However, periodic updates are useful. Furthermore, the system can compare the estimates to actual reply times to determine when the model needs to be re-learnt.

The present principles include a variety of mechanisms for the timing with which this information is presented to the sender. The estimate could be updated after one of the following, for example: (1) any keystroke while the message body has focus, focus being a computing term indicating the user interface element that is currently in the foreground and or is currently receiving input from the user; (2) a new recipient is added/removed; 3) the message body loses focus; and (4) the sender clicks a button requesting the estimate.

The model would be used to update the estimate each time one of the inputs changes. For example, if the manager of one recipient was added to the CC list, then a new estimate of the time to reply should be computed.

In an embodiment, the email correspondences from which the training examples can be extracted include, but are not limited to, one or more of the following: (1) personal correspondences between the sender and the recipient; and (2) peer correspondences. Regarding personal correspondences, in an embodiment, these would be stored on the sender system and trivially accessible to the machine learning algorithm. Regarding peer correspondence, in an embodiment, trusted peers (e.g., work colleagues) could make their emails available for training example extraction. Alternatively, peers could forward only the sub-set of meta data which they feel comfortable revealing, and only for nominated recipients.

In an embodiment, there is also the possibility of directly exchanging recipient models, including models produced by the consumer themselves. At the recipient end these models can be merged into an ensemble of estimators.

As will be appreciated by one skilled in the art, aspects of the present principles may be embodied as a system, method or computer program product. Accordingly, aspects of the present principles may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present principles may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present principles may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present principles are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present principles. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A system, comprising:
   a set of recipient behavior models for generating an estimate of a receipt time of a reply email from a recipient of an initial email using machine learning; and
   an indicator device for indicating the estimate to a user,
   wherein the set of recipient behavior models is shared among a set of trusted peers, and wherein the set of recipient behavior models is configured in a master-slave configuration, and a master recipient behavior model from among the recipient behavior models in the set is used to output the estimate that is indicated to the user.

2. The system of claim 1, wherein said recipient behavior model generates a confidence measure of the estimate.

3. The system of claim 1, further comprising a receiver for receiving at least one of the recipient behavior models in the set from a trusted peer, and wherein the more than one recipient behavior model used to generate the estimate comprises the at least one of the recipient behavior models received from the trusted peer.

4. The system of claim 1, wherein the set of recipient behavior models generates the estimate by applying the machine learning to the initial email and to training data from other emails.

5. The system of claim 4, wherein the machine learning comprises at least one of neural networks and decision tree induction.

6. A computer program product for providing an estimate of a receipt time of a reply email from a recipient of an initial email, the computer program product comprising a non-transitory computer readable storage medium having program code embodied therewith, the program code executable by a computer to perform a method comprising:
   sharing a set of recipient behavior models among a set of trusted peers;
   generating the estimate of the receipt time of the reply email from the recipient of the initial email using more than one recipient behavior model from the set of recipient behavior models and machine learning; and
   indicating the estimate to a user using an indication device,
   wherein the set of recipient behavior models is configured in a master-slave configuration, and a master recipient behavior model from among the recipient behavior models in the set is used to output the estimate that is indicated to the user.

7. The computer program product of claim 6, wherein at least one previous actual reply time is used to generate the estimate.

8. The computer program product of claim 6, wherein the method further comprises generating a confidence measure of the estimate.

9. The computer program product of claim 6, wherein said sharing step comprises receiving at least one of the recipient behavior models in the set from a trusted peer, and wherein the more than one recipient behavior model used to generate the estimate comprises the at least of the recipient behavior models received from the trusted peer.

10. The computer program product of claim 6, wherein the more than one recipient behavior model generates the estimate by applying the machine learning to the initial email and to training data from other emails.

11. The computer program product of claim 10, wherein the training data comprises at least one of a date sent, a sender, co-recipients, a recipient calendar, sender-receiver relationship information, message attributes, and a number of unread emails in an email inbox of the recipient.

12. The computer program product of claim 10, wherein the machine learning comprises at least one of neural networks and decision tree induction.

13. The computer program product of claim 10, wherein the method further comprises generating an updated estimate based on at least one of additional training data that is newly acquired and evaluated and the same training data being further evaluated over time.

14. The computer program product of claim 13, wherein the updated estimate is generated responsive to a new recipient being added or an existing recipient being removed from the initial email.

15. The computer program product of claim 13, wherein the updated estimate is generated responsive to a user request for the updated estimate.

16. The computer program product of claim 10, wherein the training data is obtained from previous personal correspondence between a sender of the initial email and the recipient of the initial email.

17. The computer program product of claim 10, wherein the training data is obtained from previous peer correspondence between trusted peers, the trusted peers including the recipient of the initial email.

18. The computer program product of claim 10, wherein the training data represents a subset of data corresponding to the previous peer correspondence, the subset determined to preserve private details in the training data.

* * * * *